United States Patent [19]

McClure et al.

[11] Patent Number: 5,418,670

[45] Date of Patent: May 23, 1995

[54] MAGNETIC RECORDING MEDIUM HAVING A SERVO PATTERN OF THE INTERMITTENT TYPE WITH COMPENSATION FOR SUPPRESSING SELF-GENERATED RESIDUAL FIELDS

[75] Inventors: Richard J. McClure, San Diego; Kenneth J. Nesslage, Santee, both of Calif.

[73] Assignee: Eastman Kodak Company, Rochester, N.Y.

[21] Appl. No.: 246,912

[22] Filed: May 20, 1994

Related U.S. Application Data

[63] Continuation of Ser. No. 736,995, Jul. 29, 1991, abandoned.

[51] Int. Cl.⁶ .................... G11B 5/74; G11B 5/584; G11B 5/596
[52] U.S. Cl. .................... 360/131; 360/134; 360/135; 360/136; 360/77.12; 360/77.08
[58] Field of Search ............. 360/134, 135, 136, 131, 360/77.05, 77.08, 77.11, 77.12, 78.02, 78.09, 78.14

[56] References Cited

U.S. PATENT DOCUMENTS

| | | |
|---|---|---|
| 3,503,059 | 3/1974 | Ambrico ........................ 346/74 |
| 4,048,660 | 9/1977 | Dennison et al. ............... 360/77 |
| 4,163,265 | 7/1979 | van Herk et al. ............... 360/135 |
| 4,167,761 | 9/1979 | Best .............................. 360/45 |
| 4,354,210 | 10/1982 | Droux ......................... 360/77.08 |
| 4,432,024 | 2/1984 | Eguchi .......................... 360/45 |
| 4,479,151 | 10/1984 | Lia et al. ...................... 360/46 |
| 4,521,816 | 6/1985 | Kougami et al. ............... 360/45 |
| 4,556,983 | 12/1985 | Heitmann et al. .............. 360/45 |
| 4,737,869 | 4/1988 | Sugaya et al. ................ 360/135 |
| 4,786,988 | 11/1988 | Kobayashi ...................... 360/40 |
| 4,797,757 | 1/1989 | Haitani ....................... 360/77.08 |
| 4,910,617 | 3/1990 | Brunnett et al. ............. 360/135 |
| 4,912,585 | 3/1990 | Belser et al. ................ 360/135 |

*Primary Examiner*—John H. Wolff
*Assistant Examiner*—Craig A. Renner
*Attorney, Agent, or Firm*—William F. Noval

[57] ABSTRACT

A magnetic recording medium has recorded thereon a series of discrete time-limited servo signal bursts. To suppress residual fields emanating from each servo signal burst, at least one half-cycle of a compensating signal is recorded immediately prior to and immediately after each signal burst of a polarity opposite the polarity of the immediately adjacent half-cycle of the servo signal burst. Furthermore, each half-cycle of each compensating signal has a magnetic moment that is weaker than the magnetic moment of one half-cycle of the immediately adjacent servo signal burst.

5 Claims, 10 Drawing Sheets

MAGNETIC RECORDING MEDIUM HAVING A SERVO PATTERN OF THE INTERMITTENT TYPE WITH COMPENSATION FOR SUPPRESSING SELF-GENERATED RESIDUAL FIELDS

This is a continuation of application Ser. No. U.S. 736,995, filed Jul. 29, 1991, now abandoned.

CROSS-REFERENCE TO A RELATED APPLICATION

Reference is hereby made to U.S. Pat. No. 5,121,270 issued on Jun. 6, 1992 in the names of Alcudia et al and entitled MULTI-TRANSDUCER HEAD POSITIONING SERVO FOR USE IN A BI-DIRECTIONAL MAGNETIC TAPE SYSTEM.

BACKGROUND OF THE INVENTION

1. Field of the Invention

The invention relates to tracking control in magnetic recording media. More particularly, the invention relates to a servo pattern of the intermittent type for improved tracking control.

2. Description Relative to the Prior Art

Figure 1:
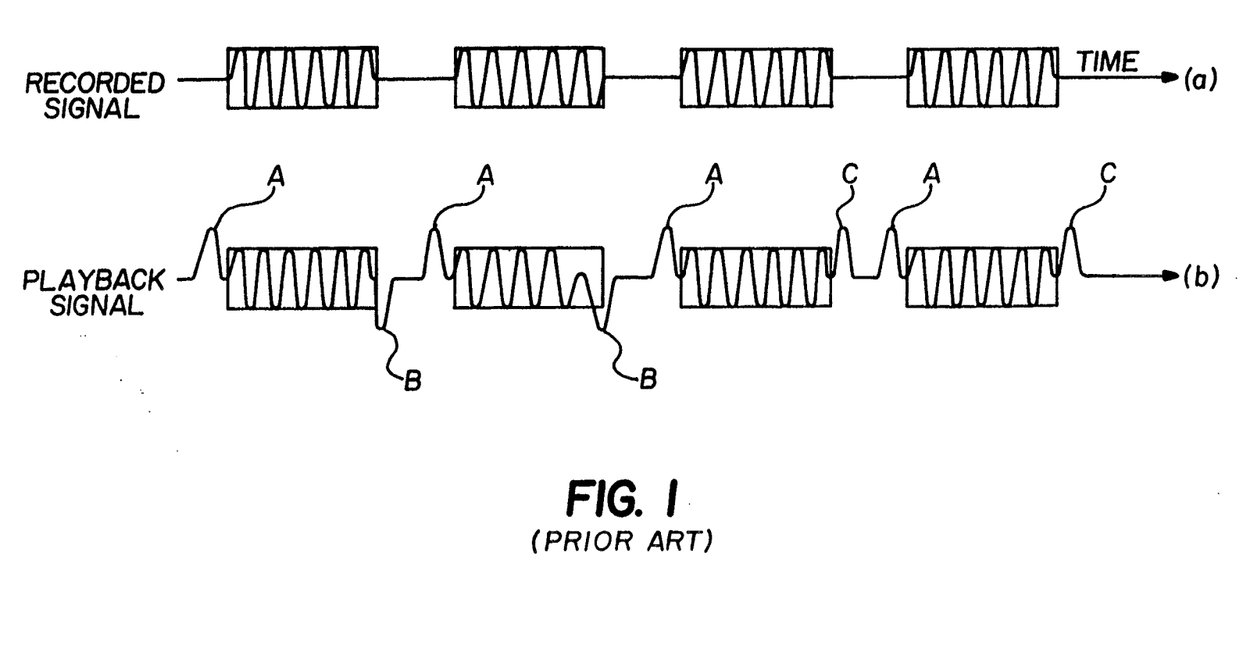
FIG. 1 illustrates the envelopes of prior art servo burst signals of the intermittent type and corresponding playback signals.

In the following description of the relevant prior art, reference is made to FIG. 1 of the accompanying drawings, which illustrates the envelopes of prior art servo burst signals of the intermittent type and corresponding playback signals.

With reference to the magnetic recording art, tracking is the process of keeping a magnetic head, either record or playback, on a particular track. The purpose of tracking control is to adjust the position of the magnetic head relative to the track or vice versa. In a recording mode, tracking control serves to maximize useable recording area without overwrite of existing record tracks. In a playback mode, tracking control functions to maintain a playback head aligned with a record track for maximum signal-to-noise output.

Tracking control is particularly advantageous for magnetic recording apparatus in which the density of tracks is very high. When playback occurs on apparatus other than that which was used for recording, tracking control has been found to be even more advantageous because of mechanical tolerance build-up inherent in different apparatus, variations in magnetic medium, either tape or disk, and other secondary tolerances.

In positioning a magnetic head over a selected track, commonly the head is locked into direct coincidence with the track by means of a closed-loop head-positioning servomechanism. The "servo" utilizes information prerecorded on the magnetic medium. It has been an accepted practice, for either disk or tape, to use either one or more tracks exclusively for permanently recorded clock and servo signals or to use data tracks characterized by the presence of so-called "embedded servo" tracking information, preferably in dedicated areas at locations interleaved with or disposed between data-recording regions along a data track. In the former, a completely separate magnetic head is dedicated exclusively to clocking and/or servo activities, whereas in the latter, the head serves both servoing and data playback activities.

Commonly, servo information is recorded on opposite sides of a reference centerline. If centered directly over the reference centerline, a magnetic head reads two signals of equal amplitude; if off-center, the amplitude of one signal played back exceeds that of the other. The closed-loop head-positioning servo serves to drive the magnetic head in a direction so as to equally match the respective amplitudes of the two servo signals played back, thereby centering the head over the reference centerline.

Of particular interest, insofar as the teachings of the present invention are concerned, is servo information of the intermittent type. That is, a servo pattern having gaps between successive time-limited servo signal bursts. U.S. Pat. No. 4,048,660 shows various servo patterns of this type.

We have found that playback signals, corresponding to servo patterns of the intermittent type, include a spurious component at the beginning and the end of each servo signal burst, i.e, in the gaps between adjacent bursts. Timelines (a) and (b) of FIG. 1 show, respectively, a servo signal of the intermittent type and the corresponding playback signal with its spurious components. More specifically, we have found that the servo signal played back has a spurious positive-going component, denoted A in FIG. 1, prior to the leading edge of each servo burst and either a spurious negative-going component, denoted B, or a spurious positive-going component, denoted C, following the trailing edge of each burst. The polarity of the trailing-edge component depends on whether the servo signal burst includes an even or an odd number of cycles.

These spurious components, either positive or negative-going, cause the head-positioning servo to produce a tracking error signal that is functionally related to the magnitude and the direction of the spurious components played back. Accordingly, with a servo pattern of the intermittent type, the head-positioning servo is unable to continuously maintain a track-following magnetic head in precise alignment with the reference centerline.

SUMMARY OF THE INVENTION

In view of the foregoing, an object of the invention is to provide, for a magnetic-recording medium, a servo pattern of the intermittent type having a corresponding playback signal that is free of spurious components. For a servo pattern containing discrete time-limited signal bursts of a predetermined frequency, this object is achieved by means of at least one half-cycle of a compensating signal recorded immediately prior to (a preamble signal) and immediately after (a post-amble signal) each time-limited servo signal burst, the polarity of the half-cycle of each compensating signal immediately adjacent a servo signal burst being opposite the polarity of the immediately adjacent half-cycle of the adjacent servo signal. The terms "immediately prior to" and "immediately after" as used herein mean either "contiguous with" or "a small interval between a compensating signal and its associated servo signal burst, with the interval being no greater than, for example, about 10 percent of the duration of the compensating signal". Although many variations are possible, each immediately adjacent half-cycle of a compensating signal, in addition to being of the opposite polarity, has a weaker magnetic moment than the immediately adjacent half-cycle of the adjacent time-limited servo burst.

For example, when the magnetic head reading servo information is of the magnetoresistive type, we prefer that only one half-cycle of each compensating signal is recorded immediately prior to and immediately after each servo burst, with each "compensation" half-cycle having a magnetic moment of about half the magnetic moment of the half-cycle of the servo burst immediately adjacent thereto. For a magnetic moment of half-strength, the recorded compensating signal can be of the same wavelength but at half the amplitude of the recorded servo burst or the recorded compensating signal can be of the same amplitude and half the wavelength of the servo burst or some combination of the two. Preferably, the respective amplitudes of the compensating signal and the servo burst are the same and the wavelength of the compensating signal is half the wavelength of the fixed-frequency servo signal.

On the other hand, when the read head is of the inductive type, we prefer that each compensating signal contains two oppositely polarized half-cycles, with the magnetic moment of the half-cycle more remote from the servo burst being weaker than the magnetic moment of the half-cycle adjacent the burst. For example, one half-cycle of a compensating signal can have a magnetic moment equal to half of the magnetic moment of one half-cycle of the servo signal and the second "compensating" half-cycle can have a magnetic moment that is a quarter of the magnetic moment of a servo burst half-cycle. When a compensating signal includes more than one half-cycle, the respective polarities of each compensating half-cycle alternate, with the polarity of the compensating half-cycle immediately adjacent the servo signal burst being opposite the polarity of the immediately adjacent servo half-cycle.

With a servo pattern of the intermittent type having both preamble and a post-amble compensating signals in accordance with the teachings of the invention, the corresponding playback signal is effectively free of significant measurable spurious components. In the absence of spurious components, a head-positioning servo, responsive to the playback signal, is able to maintain an associated magnetic record/playback head in precision alignment with the centerline of a track being followed.

This advantage, as well as other advantages of the invention, will become more apparent in the detailed description of preferred embodiments presented below.

BRIEF DESCRIPTION OF THE DRAWINGS

In the detailed description of preferred embodiments of the invention presented below, reference is made to the accompanying drawings, in which.

DETAILED DESCRIPTION OF PREFERRED EMBODIMENTS

An object of the invention is to provide, for a magnetic recording medium such as a disk or tape, a servo pattern of the intermittent type which, when played back, is free of spurious components.

Stray magnetization fields arise from any magnetized material that is "unkeepered". This condition can be found in a high-coercivity composition such as is utilized in a magnetic recording medium or low-coercivity material such as is used for a magnetic head. These stray magnetization fields are self-generated and are essentially due to flux lines exiting primarily from the leading and trailing ends, i.e., end dipoles, of a magnetized material.

For example, in a linear array of oppositely polarized equal-size and remanence-value magnets, each magnet has an external field of which half is cancelled by each adjacent magnet, except for the two magnets at opposing ends of the array. Each end magnet will have half of its field uncompensated. A compensation or partial cancellation of a stray field is provided by adding a magnet of half strength on each end of the array, polarized oppositely with respect to its adjacent magnet. U.S. Pat. No. 4,893,208, assigned to the assignee of this invention, discloses an elongated magnetic erase head having end terminator magnets for suppressing self-generated residual magnetization.

Figure 2:
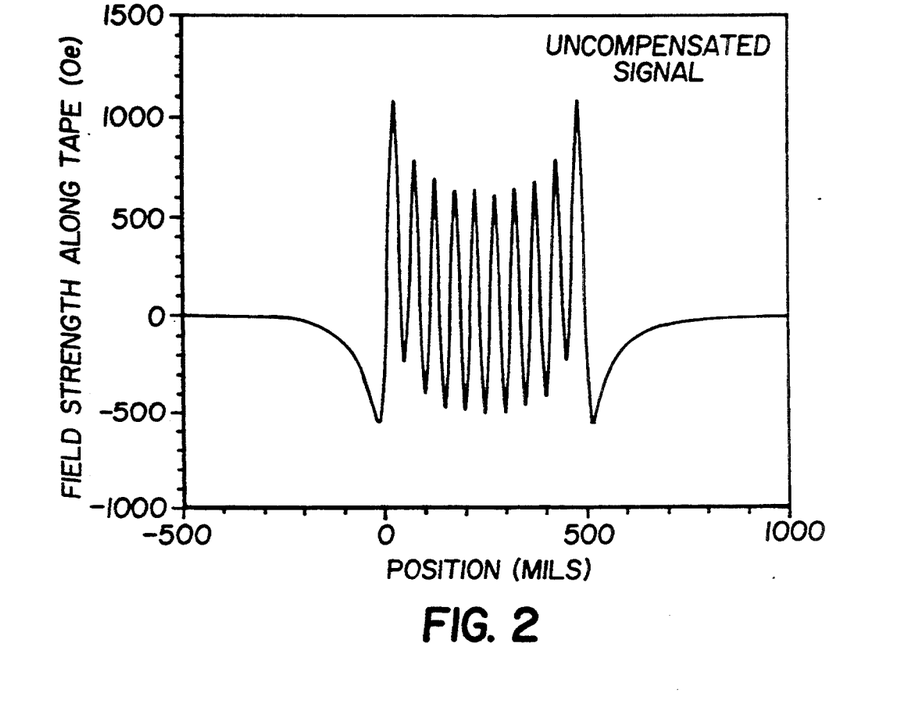
FIGS. 2 and 3 illustrate, respectively, field strength along a magnetic tape having an "uncompensated" and "compensated" uniform signal recorded thereon.

Similarly, a magnetic medium, having a time-limited fixed-frequency signal, contains a sequence of contiguous alternately polarized magnetized sites of equal size and remanence value. Each magnetized site corresponds to a half-wavelength or a half-cycle of the recorded signal. The first and last half-cycle of the recorded signal, like the aforementioned linear array of oppositely polarized magnets, have half their respective external fields uncompensated. FIG. 2 shows the external field strength of ten (10) cycles of a 50-mil wavelength signal. Note, the negative-going spike in the external field immediately prior to and after the first and last half-cycles of the recorded signal.

Figure 3:
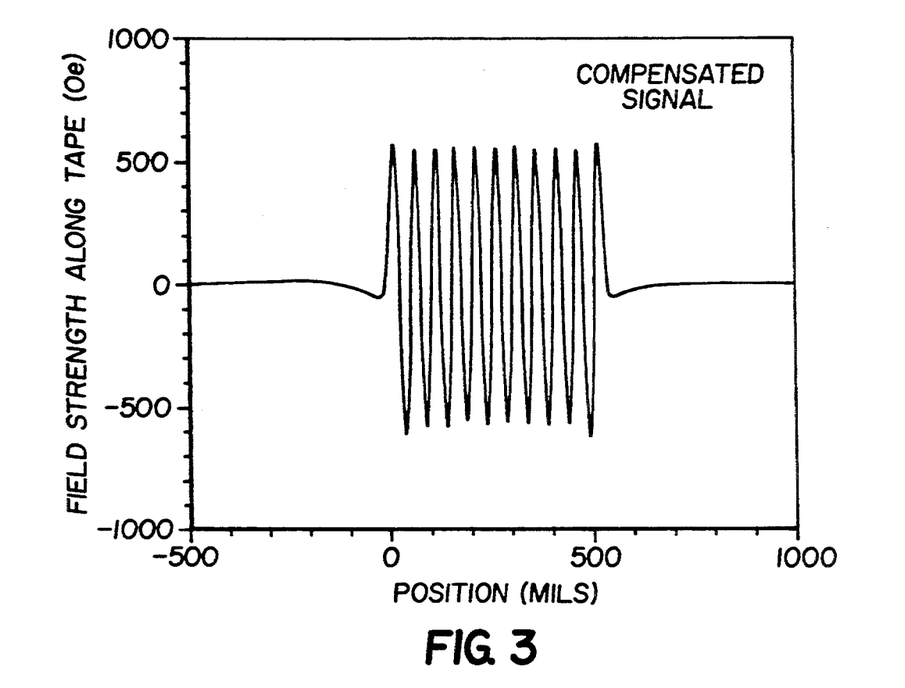

FIG. 3, on the other hand, illustrates the external field strength of several cycles, i.e. 10 ½, of a recorded 50-mil wavelength signal in which half the external field of the first and last half-cycles is compensated, respectively, by recording one half-cycle of a signal of half-strength and opposite polarity immediately prior to and after the first and last half-cycles of the recorded signal. Note, the nearly total absence of a spurious component in the external field at the beginning and the end of the recorded signal.

We believe that spurious components, associated with the playback signal corresponding to a recorded servo pattern of the intermittent type, arise from stray magnetization fields emanating primarily from the first and last half-cycles in each burst of a recorded servo pattern. To achieve the object of this invention, e.g., suppress spurious components in a playback signal associated with a servo signal of the intermittent type, a preamble compensating signal is recorded immediately prior to the leading edge of each servo signal burst and a post-amble compensating signal is recorded immediately after the trailing edge of each servo burst.

Figure 4:
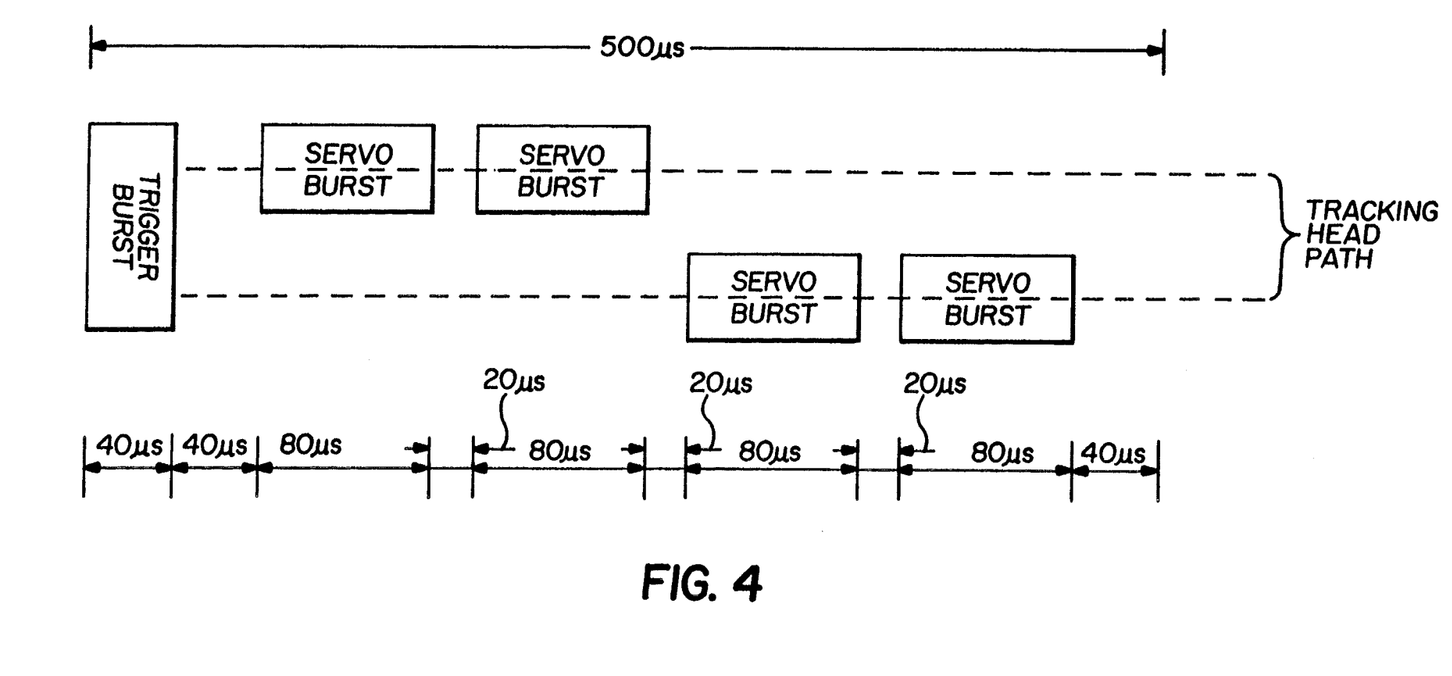
FIG. 4 illustrates one field of a repetitive servo pattern of the intermittent type.

FIG. 4 shows one field of a repetitive 500-µs servo pattern containing a single 40-µs trigger burst followed by a servo signal of the intermittent type containing four discrete 80-µs servo bursts, with the first two servo bursts to one side of the path of a servo tracking head and the last two servo bursts on the opposite side of the tracking head path. As shown, there is a 20-µs gap between successive servo bursts and the first and last servo burst in the field are preceded and followed by a 40-µs gap. The trigger burst and each servo burst consist of a uniform, i.e., constant amplitude, 500-KHz signal. In other words, the trigger burst and each servo burst contain, respectively, 20 and 40 cycles of a 500-KHz signal.

Each trigger burst provides timing for sampling the servo bursts in the field. With repetitive fields, a train of trigger bursts serves for measuring the speed of the magnetic recording medium.

Figure 5:
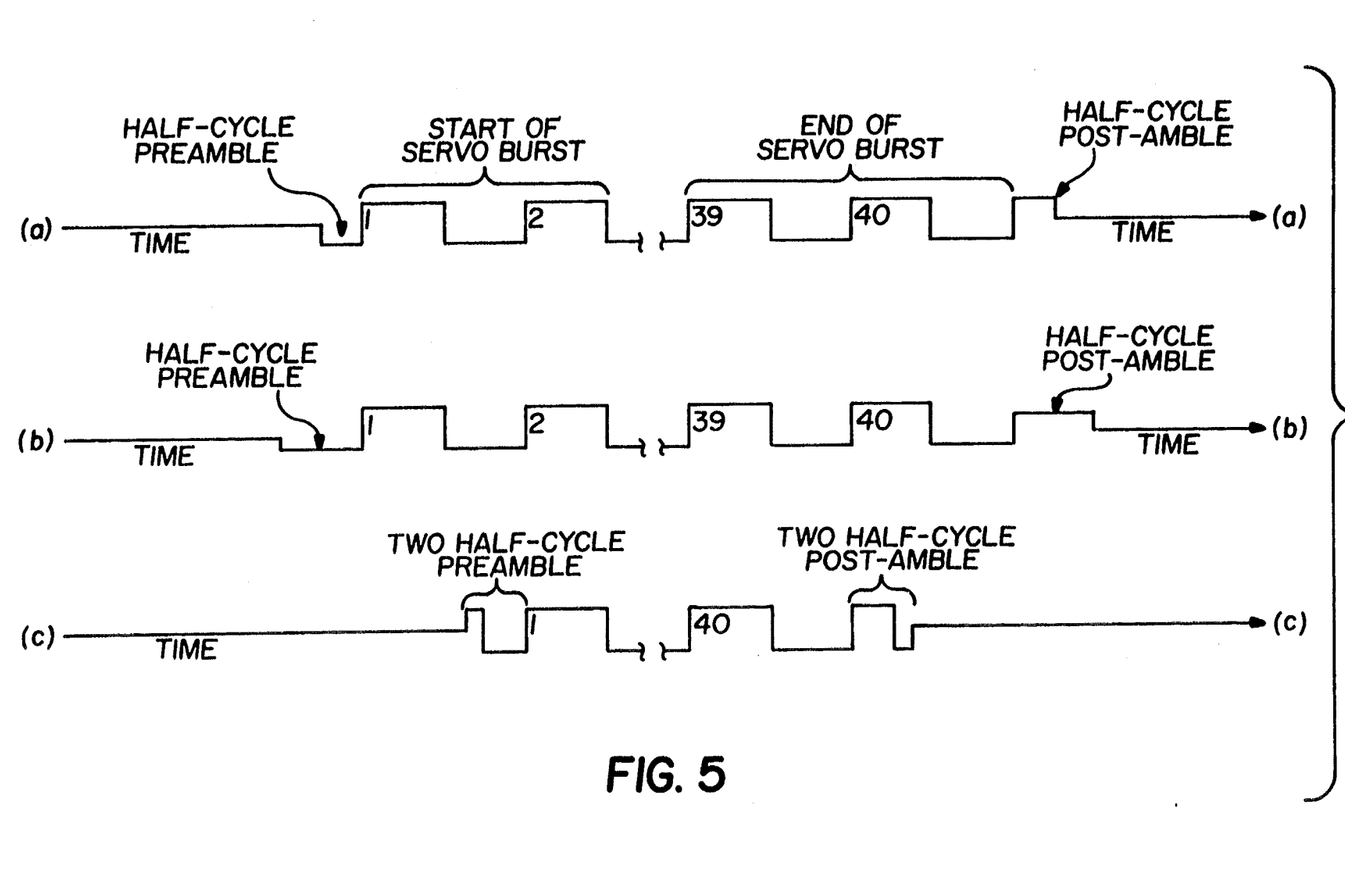
FIG. 5 illustrates three embodiments of compensating signal patterns in accordance with the invention.

FIG. 5 shows exemplary compensating signals within the scope of the present invention. An exploded, broken timeline (a) of FIG. 5 shows the first two and the last two cycles of one 80-µs servo burst together with a preamble compensating signal and a post-amble compensating signal in accordance with a preferred embodiment of the invention. As shown, both the preamble and the post-amble signal contain a single half-cycle of the same amplitude as the uniform servo burst; each compensating signal, however, has a wavelength that is only half the wavelength of the fixed-frequency servo burst and a polarity which is opposite the polarity of the half-cycle of the servo signal immediately adjacent the compensating signal. In other words, the magnetic moment of each compensating half-cycle is half the magnetic moment of one half-cycle of the servo burst, with a direction opposite the direction of the half-cycle of the servo signal immediately adjacent thereto.

The exploded timeline (b) of FIG. 5 shows an alternative preferred embodiment of two oppositely polarized half-cycle compensating signals having a magnetic moment of half the magnetic moment of one half-cycle of the servo burst. In this case, each compensating signal has the same wavelength as the uniform servo burst; the amplitude of each compensating signal, however, is half the amplitude of the servo burst. We have found that the compensating signals of timelines (a) and (b) of FIG. 5 are particularly suitable for suppressing spurious signals when the playback head is of the MR type.

The exploded timeline (c) of FIG. 5 shows a two-half-cycle preamble compensating signal and two-half-cycle post-amble compensating signal for use with an inductive playback head. For both the preamble and the post-amble, the magnetic moment of the half-cycle immediately adjacent the servo signal burst is stronger than the more remote half-cycle. More specifically, the more remote half-cycle of each compensating signal has a wavelength that is half the wavelength of the intermediate compensating half-cycle which, in turn, has a wavelength that is half the wavelength of the servo burst signal. In this case, however, the respective amplitudes of each compensating signal and the servo burst signal are the same, although successive compensating half-cycles are of alternate polarity. Accordingly, the first and second half-cycles of the preamble and the second and first half-cycles of the post-amble have, respectively, a magnetic moment of a fourth and a half of the magnetic moment of one half-cycle of the servo burst.

Figure 6:
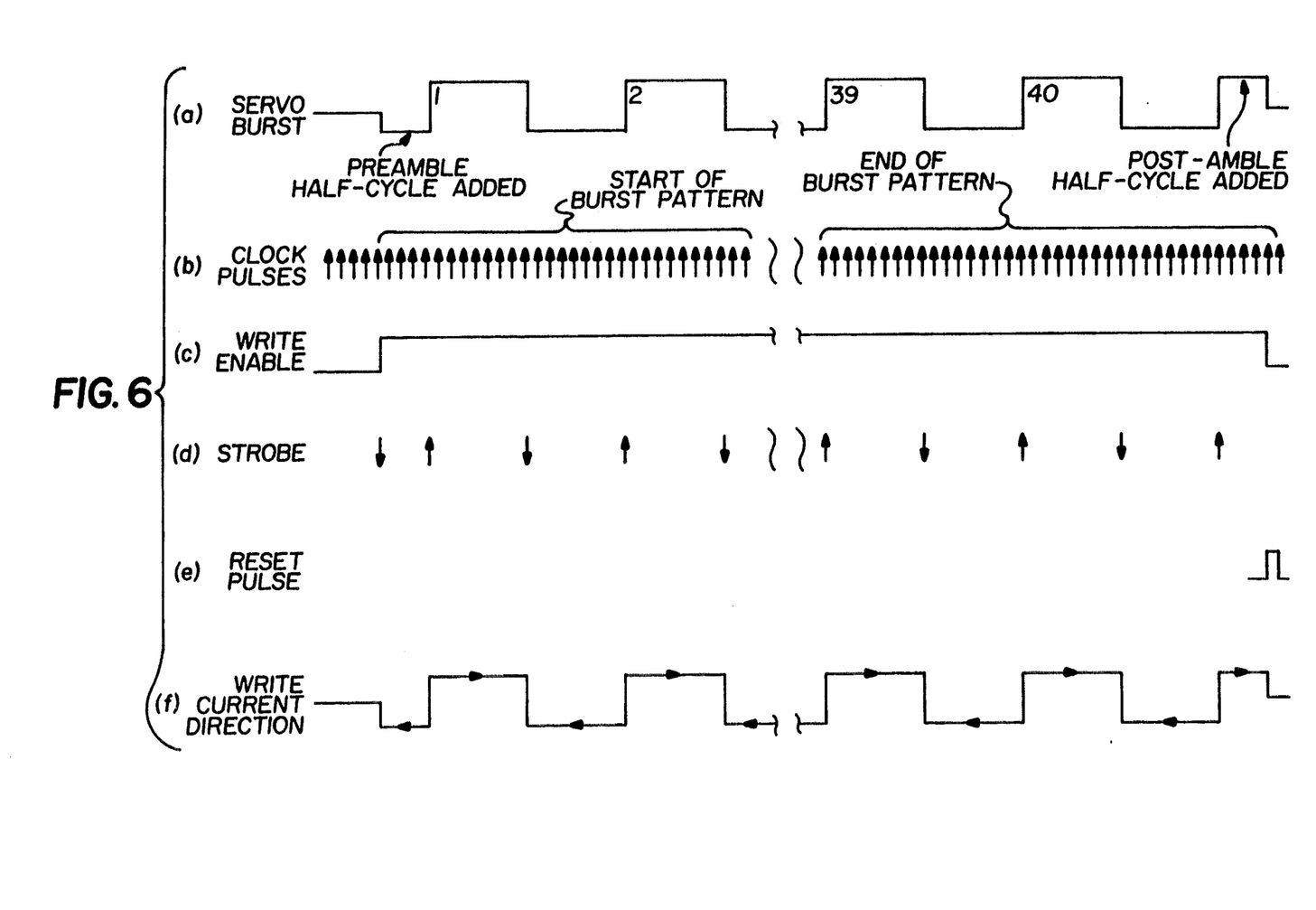
FIG. 6 is a set of waveforms useful in describing the operation of the circuitry of FIG. 5.
Figure 7:
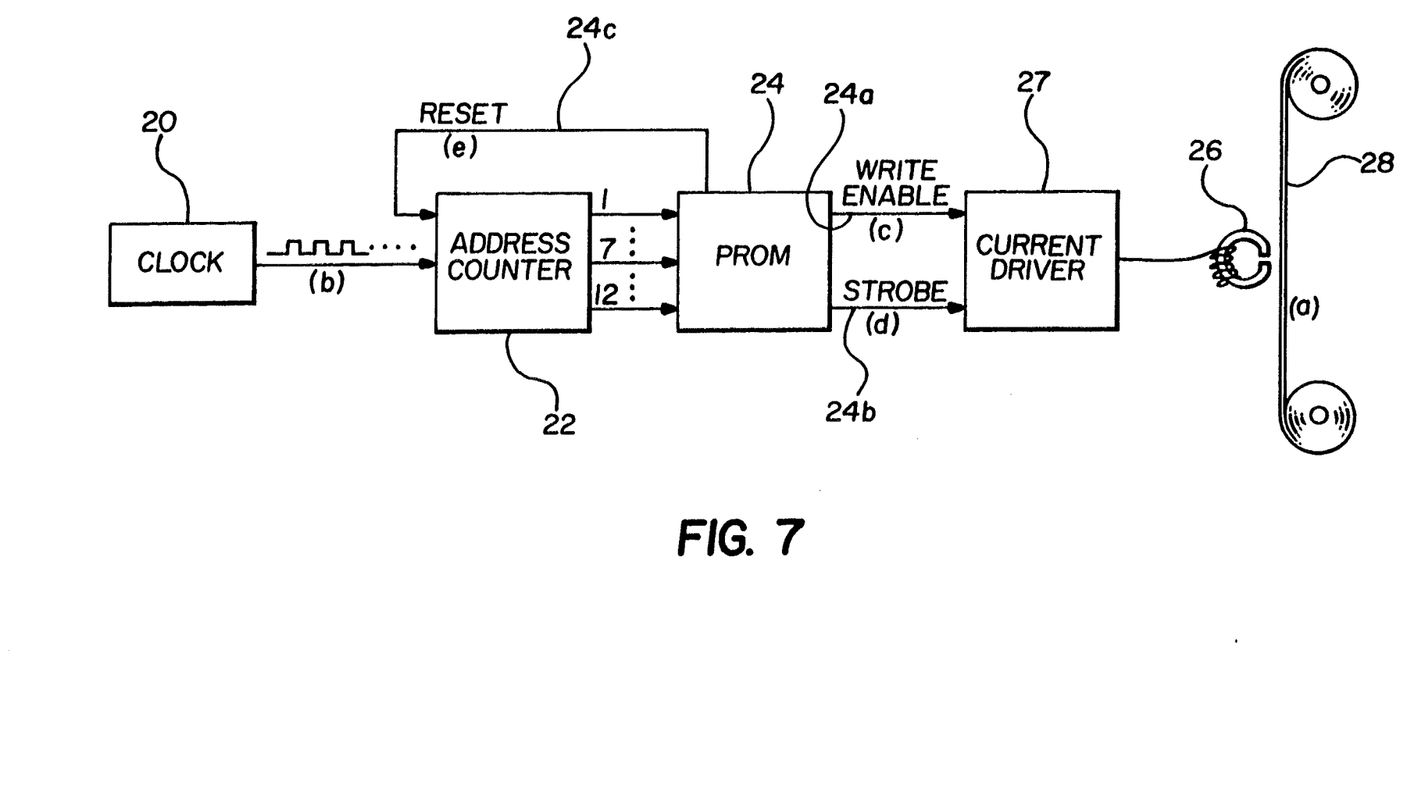
FIG. 7 is a schematic block diagram of circuitry for recording a servo pattern having compensating signals in accordance with the invention.

FIGS. 6 and 7 show, respectively, the timing and circuitry for pre-formatting a single track of a magnetic recording medium with the servo pattern having preamble and post-amble compensating signals, in accordance with the teachings of the present invention. (The letters associated with the waveform diagrams of FIG. 6 are indicated at the appropriate points in the schematic of FIG. 7 to facilitate understanding of the operation of the circuitry.)

The broken timeline (a) of FIG. 6 shows one 40-cycle burst of a 500-KHz servo signal with a one half-cycle preamble signal and a one half-cycle post-amble signal. In timeline (a), the preamble and post-amble signals and the servo burst all have the same amplitude, but the preamble and the post-amble have a wavelength that is half the wavelength of the servo burst.

Referring to FIG. 7, a clock 20 functions to produce a train of pulses at an 8-MHz rate. The timeline (b) of FIG. 6 shows this pulse train. At an 8-MHz rate, eight clock pulses are produced for each half-cycle of the servo burst, whereas only four clock pulses occur for each half-cycle compensating signal. For a 500-µs servo field such as is shown in FIG. 4, 4000 clock pulses are produced.

A binary address counter 22, connected to the output of the clock 20, serves to produce a clock count that cycles between an initial value, corresponding to the beginning of a servo field, and a final value, corresponding to the end of the servo field. For a 500-µs servo field, the address counter 22 has twelve outputs for providing a binary count from 0 to 4096.

A programmable read only memory (PROM) 24, connected to the output of the address counter 22, is programmed to cause a write current of the appropriate frequency to be supplied at the proper time to a magnetic servo record head 26. In order to provide correct timing, the PROM 24 provides an enable signal on a first output 24a when a write current is to be produced. Write current frequency, on the other hand, is controlled by means of a 2-state strobe signal on a second output 24b. One state causes write current to flow in one direction and the second state causes current flow in the opposite direction. The enable signal is shown on timeline (c) of FIG. 6 as being high when a signal is to be recorded and low when a blank or gap is to occur in the servo field recorded on a magnetic tape 28. The strobe signal, shown on timeline (d), toggles back and forth between its two states when one half-cycle of a recorded signal ends and the following half-cycle begins. This toggling action occurs, of course, each time the PROM 24, under program control, receives a predetermined clock count from the address counter 22.

Additionally, the PROM 24, by means of a reset line 24c, serves to initialize the output of counter 22 to zero at the end of each servo field. A reset pulse is shown at the end of the timeline (e) of FIG. 6.

A current driver 27, connected to the two outputs of the PROM 24, provides a constant amplitude write current of the proper frequency to the servo write head 26. The direction of the write current is shown diagrammatically on timeline (f) of FIG. 6.

Figure 8:
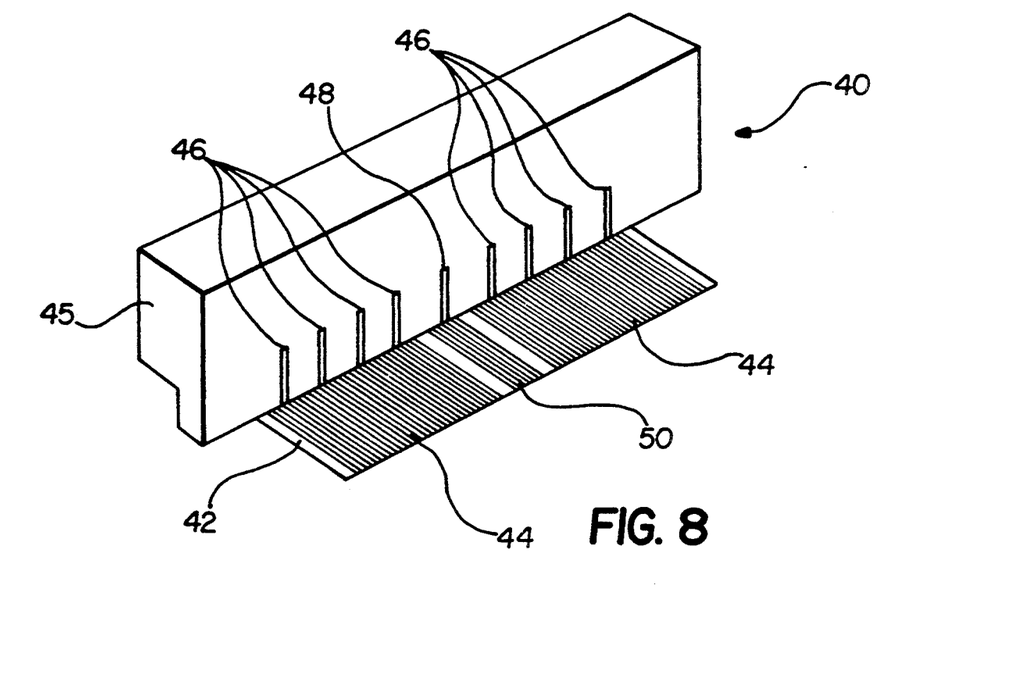
FIG. 8 is a perspective view of a head-to-tape interface for multi-channel linear recording apparatus which uses the present invention.

FIG. 8 is a perspective view of a head-to-tape interface for a bi-directional multi-channel linear recording apparatus, denoted generally 40, for which the present invention is used. A magnetic tape 42 contains two groups of twenty data tracks 44. The forty data tracks 44 are accessed at 62.5 inches per second (ips) by five passes of the tape across a head assembly 45 containing eight magnetic record/playback heads 46. A ninth head 48, situated between two groups of four record/playback heads 46, serves as a servo read head for playing back pre-formatted servo information distributed on six dedicated servo tracks 50 located at the center of the tape 42, between the two groups of twenty data tracks 44.

Figure 9:
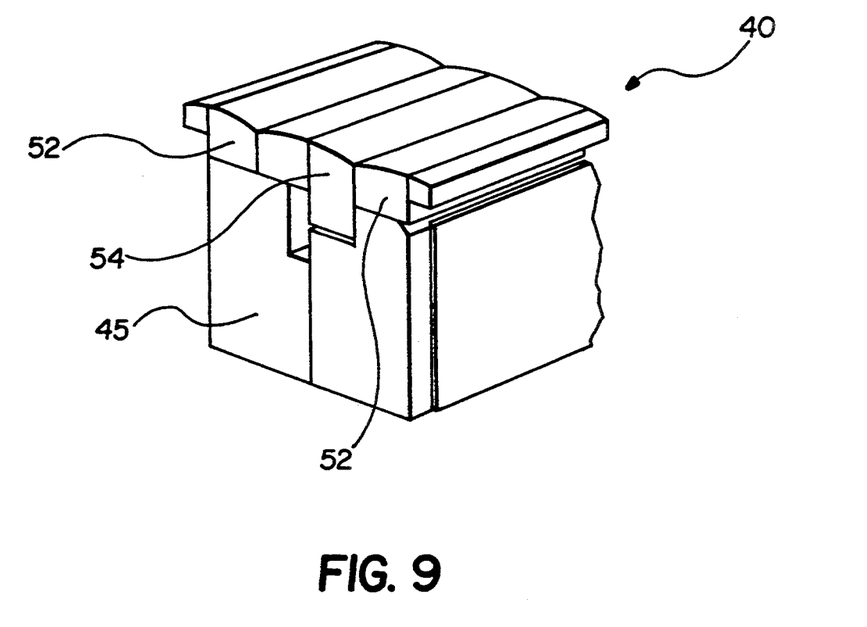
FIG. 9 is a perspective view of a multi-channel magnetic head assembly used with the recording apparatus of FIG. 6.

The bi-directional linear recording apparatus 40 operates in a read-while-write mode in both directions of tape motion wherein data is recorded in a serpentine pattern. For that purpose, the head assembly 45 is in the form of a triple multi-gap-line head (FIG. 9). In a presently preferred embodiment, the head assembly 45 is comprised of two multi-gap-lines 52 of thin film inductive write heads, on either side of a multi-gap-line 54 of thin film magnetoresistive (MR) read heads. When tape is driven in a forward direction, the write head line 52 to the left of the MR read head line 54, as viewed in the drawing, serves for recording while the MR read heads play back the data just recorded; in the reverse direction of tape travel, the write head line to the right of the MR read head line 54 is operated for recording. It will be understood by those skilled in the art that alternatively the head assembly 45 could be composed of two lines of playback heads, one on either side of a single line of record heads.

Figure 10:
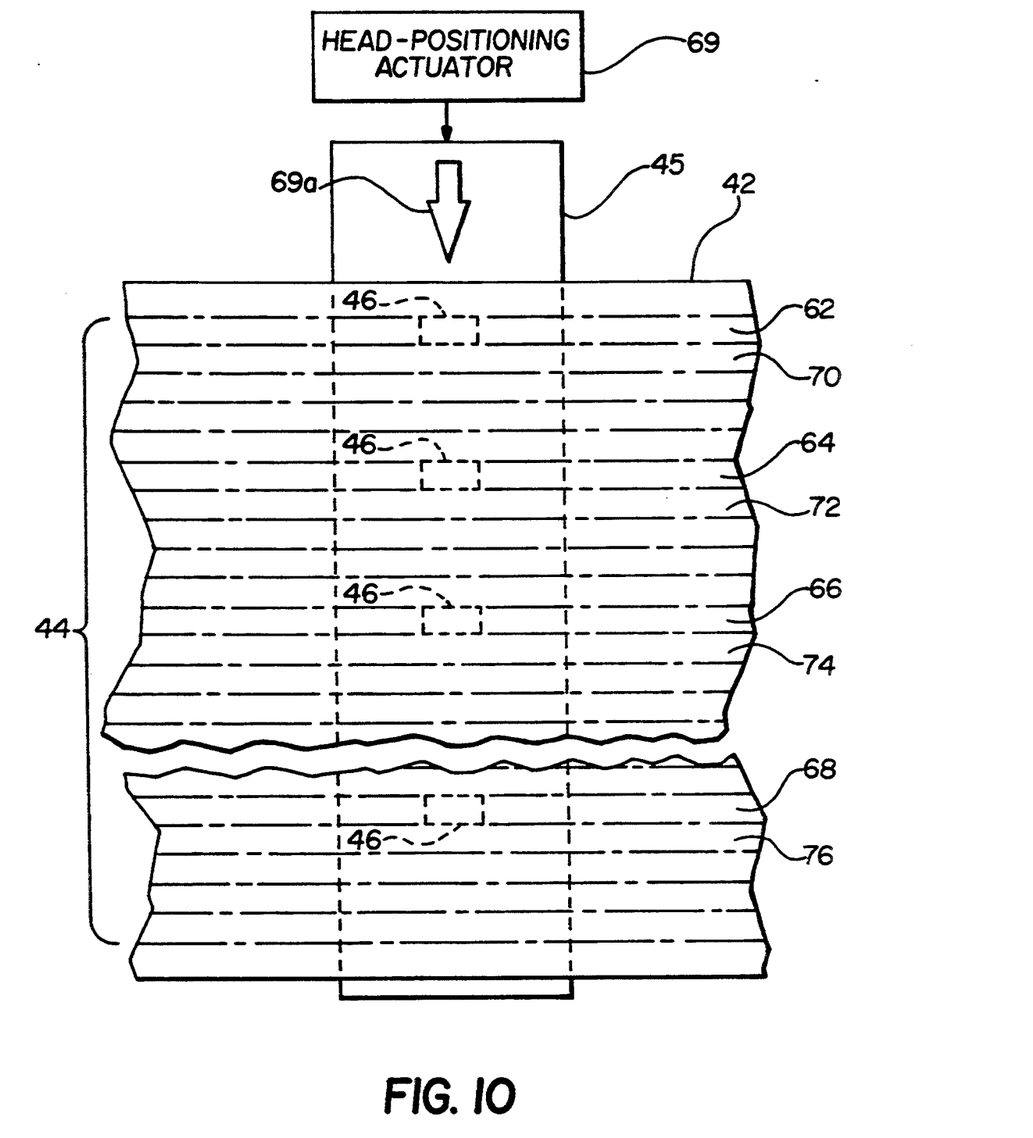
FIG. 10 is a broken planar view showing multiple magnetic heads aligned with respective tracks of a multi-track magnetic tape.

Data are recorded and played back from the forty data tracks 44 by incrementally positioning the head assembly 45 in five discrete positions across the width of the tape 42. The broken planar view of FIG. 10 shows four of the eight data record/playback heads 46 positioned for recording, respectively, on tracks 62, 64, 66 and 68 during one pass of the tape 42. Under the control of a head-positioning actuator 69, the head assembly 45 is incrementally stepped in the direction of the arrow 69a wherein the four heads 46 that are shown are positioned for recording on tracks denoted 70, 72, 74 and 76. For recording on those four tracks, the tape 42 is now transported in the reverse direction. To record over the entire useable area of the tape 42, data are recorded on the tape 42 in a serpentine pattern during three tape passes in one direction and two passes in the opposite direction.

Tape speed and head position are controlled by two servos, operating through a microprocessor, which derive their input signals from two sets of data recorded on the six centrally disposed servo tracks 50 of the tape 42. One set consists of regularly spaced timing bursts 80 (FIG. 11) which serve to measure tape speed and to control the sampling of the other set—discrete time-limited servo signal bursts—denoted generally 82.

Figure 11:
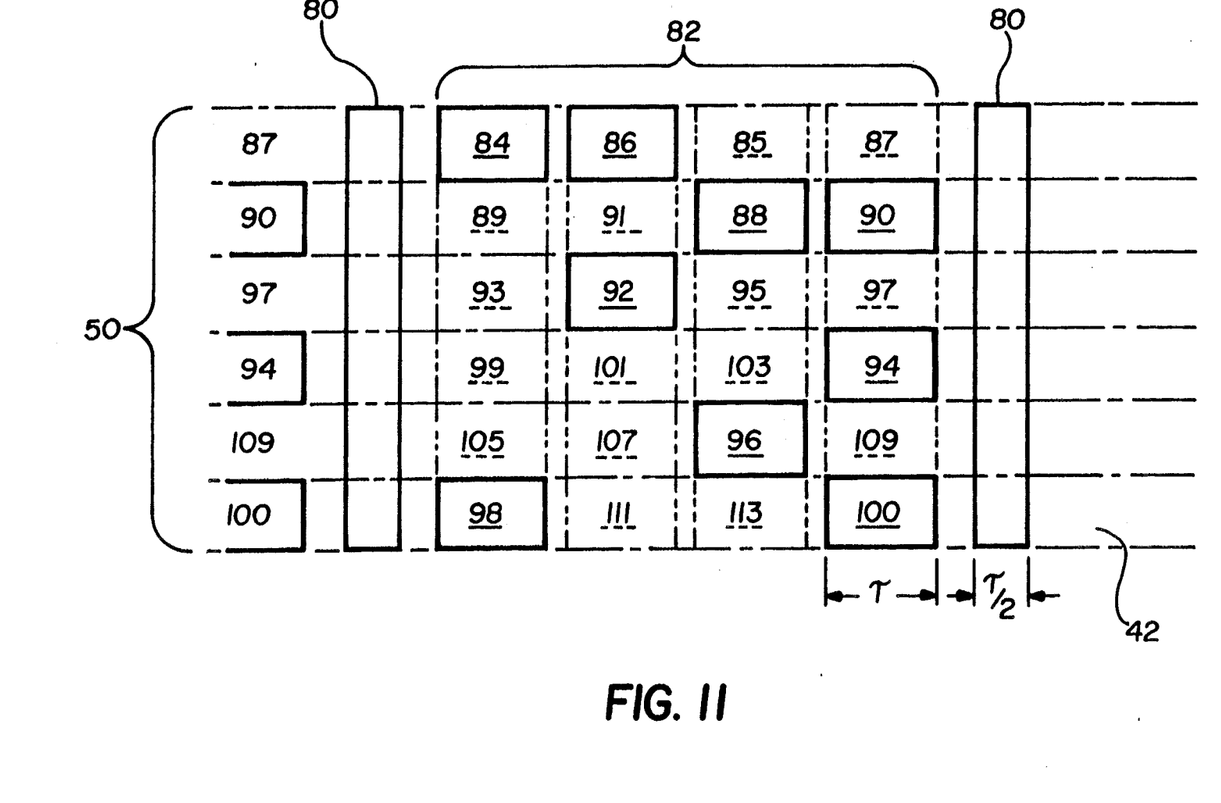
FIG. 11 is a plan view of various servo burst signals on multiple servo tracks of a magnetic tape.
Figure 12:
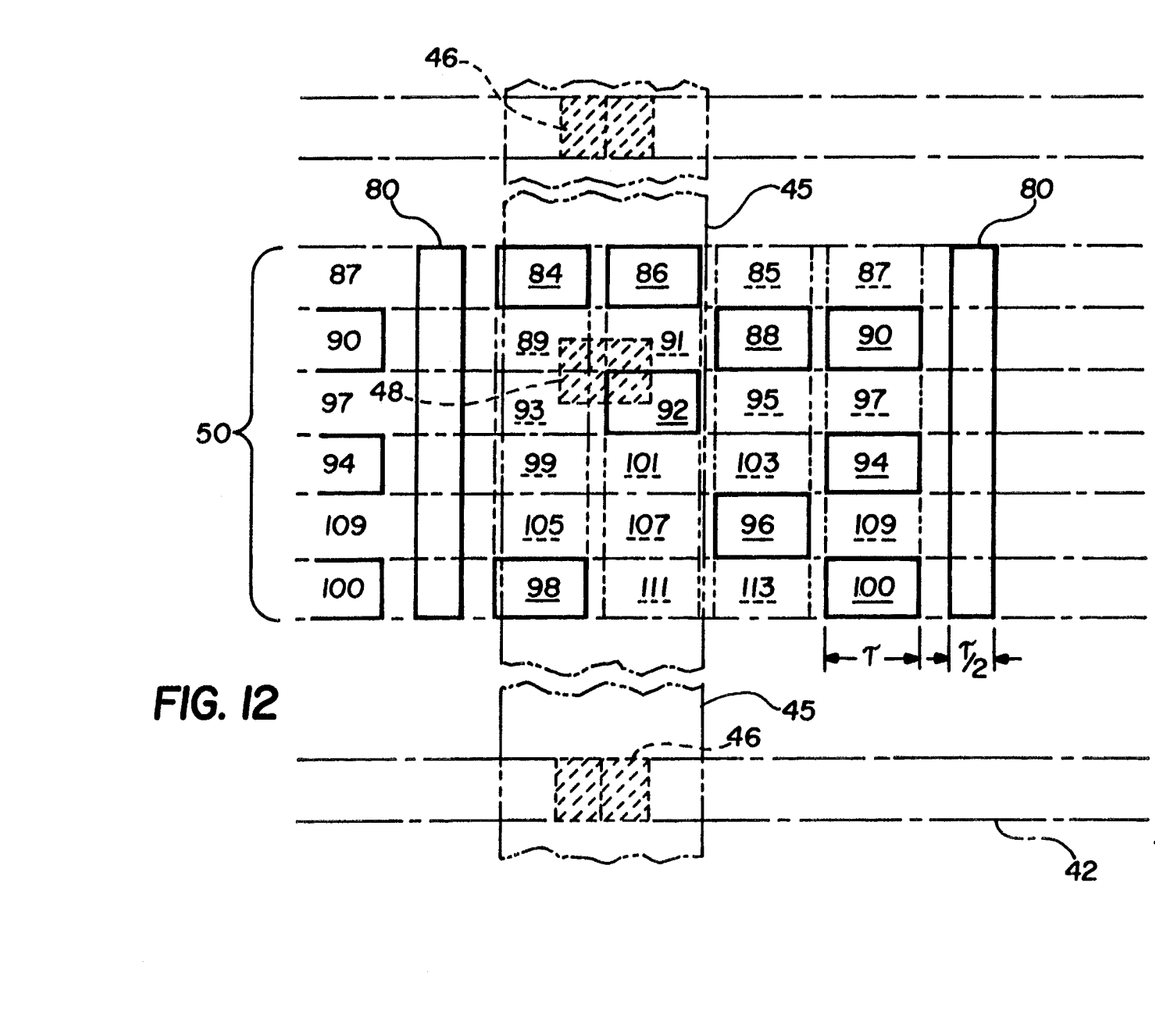
FIG. 12 is a plan view showing a servo read head straddling two of the servo tracks of FIG. 9.

The set 82 of servo signal bursts is composed of repetitive magnetized blocks (even reference numbers 84 through 100) defining binary "1" bits and non-magnetized blocks (odd reference numbers 85 through 113) defining binary "0" bits. The servo signal bursts on six tracks are used in so-called split field pairs to derive a servo null signal for five "on-center" positions. Each on-center position occurs when the servo read head 48 (FIG. 12) equally straddles two adjacent servo tracks 50. Patentable features of these split field pairs are disclosed and claimed in the aforecited U.S. Pat. No. 5,121,270.

With an MR playback head, each magnetized block (even reference numbers), in accordance with the teachings of the invention, begins and ends with one half-cycle of a compensating signal polarized opposite the immediately adjacent half-cycle of the servo signal. Preferably, each recorded compensating half-cycle has a magnetic moment that is half the magnetic moment of one half-cycle of the adjacent servo burst signal. In a presently preferred embodiment, each recorded servo signal burst has a duration, T, of 80 $\mu$s and consists of forty cycles of a pulsed 500 KHz signal. Preferably, each compensating signal has the same amplitude as the 500-KHz signal of each magnetized block, but a wavelength that is half the wavelength recorded for the 500-KHz signal.

The timing bursts 80, in addition to measuring tape speed, also serve as a reference signal against which the respective amplitudes of the appropriate split field pairs are compared. The timing bursts 80, like the servo signal bursts, are time-limited and are of the intermittent type. Accordingly, we have found it advantageous to also begin and end each recorded timing burst with a one half-cycle compensating signal the magnetic moment of which is in the opposite direction and is half the magnetic moment of the immediately adjacent half-cycle of the timing burst. This is conveniently accomplished by also selecting a 500-KHz signal for each timing burst.

The invention has been described in detail with reference to the figures. It will be appreciated, however, that variations and modifications are possible within the spirit and scope of the invention.

What is claimed is:

1. A magnetic recording medium having recorded thereon a series of discrete time-limited servo signal bursts recorded in varying servo patterns in each of a series of adjacent servo tracks, each of said servo signal bursts containing a sequence of contiguous alternatively polarized half-cycles, wherein the improvement in said discrete time-limited servo signal bursts comprises:

at least one half-cycle of compensating signal recorded within a servo track immediately prior to and immediately after each said sequence of contiguous alternatively polarized half-cycles of each of said discrete time-limited servo signal bursts in substantially every adjacent track, each said half-cycle of compensating signal having both an opposite polarity and a weaker magnetic moment than an immediately adjacent half-cycle of an adjacent servo signal burst which suppresses residual fields emanating from each said servo signal bursts that are manifested as spurious components in a playback signal waveform derived by a magnetic read head in tracking each of said servo signal bursts.

2. The magnetic recording medium as defined in claim 1, wherein each said compensating signal contains only one half-cycle, the magnetic moment of which is approximately half the magnetic moment of the immediately adjacent half-cycle of the adjacent servo signal burst.

3. The magnetic recording medium as defined in claim 1, wherein each said compensating signal contains first and second alternately polarized half-cycles, with the first half-cycle thereof having a magnetic moment that is stronger than the magnetic moment of the second half-cycle.

4. The magnetic recording medium as defined in claim 3, wherein the first half-cycle of each said compensating signal is interposed between the adjacent servo signal burst and the second half-cycle of each said compensating signal.

5. The magnetic recording medium as defined in claim 4, wherein the second half-cycle of each said compensating signal has a magnetic moment which is approximately a fourth of the magnetic moment of the immediately adjacent half-cycle of the adjacent servo signal burst, and the first half-cycle of each said compensating signal has a magnetic moment which is approximately half the magnetic moment of the immediately adjacent half-cycle of the adjacent servo signal burst.

* * * * *